US010324707B2

(12) United States Patent
Su et al.

(10) Patent No.: US 10,324,707 B2
(45) Date of Patent: Jun. 18, 2019

(54) METHOD, APPARATUS, AND COMPUTER-READABLE STORAGE MEDIUM FOR UPGRADING A ZIGBEE DEVICE

(71) Applicant: Beijing Xiaomi Mobile Software Co., Ltd., Beijing (CN)

(72) Inventors: Benchang Su, Beijing (CN); Deguo Meng, Beijing (CN); Enxing Hou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/602,359

(22) Filed: May 23, 2017

(65) Prior Publication Data

US 2017/0344357 A1 Nov. 30, 2017

(30) Foreign Application Priority Data

May 25, 2016 (CN) .......................... 2016 1 0356502

(51) Int. Cl.
*G06F 9/44* (2018.01)
*G06F 9/445* (2018.01)
(Continued)

(52) U.S. Cl.
CPC .................. *G06F 8/65* (2013.01); *G06F 8/71* (2013.01); *G06F 16/951* (2019.01); *H04L 67/26* (2013.01);
(Continued)

(58) Field of Classification Search
CPC ........ G06F 8/65; G06F 8/71; G06F 17/30864; G06F 16/951; H04L 67/26; H04W 4/50
See application file for complete search history.

(56) References Cited

U.S. PATENT DOCUMENTS 8,214,653 B1* 7/2012 Marr ..................... G06F 21/572
  713/189
8,264,371 B2* 9/2012 McFarland ......... H04L 12/2827
  340/870.01
(Continued)

FOREIGN PATENT DOCUMENTS

CN 101610501 A 12/2009
CN 102136934 A 7/2011
(Continued)

OTHER PUBLICATIONS

Texas Instruments, Secure In-Field Firmware Updates for MSP MCUs, 2015, pp. 1-13. http://www.ti.com/lit/an/slaa682/slaa682.pdf (Year: 2015).*
(Continued)

*Primary Examiner* — Mongbao Nguyen
(74) *Attorney, Agent, or Firm* — Finnegan, Henderson, Farabow, Garrett & Dunner LLP

(57) ABSTRACT

A method for upgrading a ZigBee device, includes: downloading, when firmware of the ZigBee device needs to be upgraded, a latest version of the firmware from a server; pushing the latest version of the firmware to the ZigBee device; and issuing a firmware upgrade instruction to the ZigBee device after the latest version of the firmware is pushed to the ZigBee device successfully, to trigger the firmware of the ZigBee device to be upgraded based on the latest version of the firmware.

5 Claims, 8 Drawing Sheets

(51) Int. Cl.
*G06F 8/65* (2018.01)
*G06F 16/951* (2019.01)
*G06F 8/71* (2018.01)
*H04L 29/08* (2006.01)
*H04W 8/24* (2009.01)
*H04W 4/50* (2018.01)
*H04W 84/18* (2009.01)

(52) U.S. Cl.
CPC ............ *H04L 67/34* (2013.01); *H04W 4/50* (2018.02); *H04W 8/245* (2013.01); *H04W 84/18* (2013.01)

(56) References Cited

U.S. PATENT DOCUMENTS

| | | | | |
|---|---|---|---|---|
| 8,676,187 | B2* | 3/2014 | Ionescu | H04W 8/183 380/233 |
| 10,200,504 | B2* | 2/2019 | Decenzo | H04L 65/4084 |
| 2007/0093243 | A1* | 4/2007 | Kapadekar | H04M 3/42178 455/419 |
| 2009/0075641 | A1* | 3/2009 | Guven | G06F 8/65 455/419 |
| 2009/0150878 | A1* | 6/2009 | Pathak | G06F 8/65 717/172 |
| 2010/0107150 | A1* | 4/2010 | Kamada | G06F 8/65 717/170 |
| 2010/0169877 | A1* | 7/2010 | Ackerman | G06F 3/1204 717/171 |
| 2011/0239208 | A1* | 9/2011 | Jung | G06F 8/65 717/170 |
| 2013/0185563 | A1* | 7/2013 | Djabarov | G06F 8/654 713/176 |
| 2014/0109076 | A1* | 4/2014 | Boone | G06F 8/65 717/170 |
| 2014/0115574 | A1* | 4/2014 | Valentine | H04L 67/34 717/172 |
| 2014/0282486 | A1* | 9/2014 | Hisamoto | G06F 8/65 717/173 |
| 2014/0304699 | A1* | 10/2014 | He | H04W 8/245 717/171 |
| 2015/0074658 | A1* | 3/2015 | Gourlay | G05B 15/02 717/172 |
| 2016/0006264 | A1* | 1/2016 | Alperin | H04W 52/0216 307/104 |
| 2016/0054778 | A1 | 2/2016 | Shin et al. | |
| 2017/0090909 | A1* | 3/2017 | Guo | G06F 8/66 |
| 2017/0141968 | A1* | 5/2017 | Lloyd | H04L 41/22 |
| 2017/0187523 | A1* | 6/2017 | Andrews | H04L 63/00 |
| 2017/0222815 | A1* | 8/2017 | Meriac | G06F 21/554 |

FOREIGN PATENT DOCUMENTS

| | | |
|---|---|---|
| CN | 102541599 A | 7/2012 |
| CN | 103425507 A | 12/2013 |
| CN | 104579719 A | 4/2015 |
| CN | 105335183 A | 2/2016 |
| CN | 105472465 A | 4/2016 |
| EP | 2 799 985 A2 | 5/2014 |

OTHER PUBLICATIONS

Die Wu, R2: Over-the-Air Reprogramming on Computational RFIDs, 2016, pp. 1-8. https://ieeexplore.ieee.org/stamp/stamp.jsp?tp=&arnumber=7488004 (Year: 2016).*

De Silva G.S.H., SmartBee Multichannel Access ZigBee Gateway with Plug and Play Device Interface for Smart, 2008, pp. 251-256. https://ieeexplore.ieee.org/stamp/stamp.jsp?tp=&arnumber=4783948 (Year: 2008).*

Vivek G.V, Enabling IOT Services using WiFi-Zigbee Gateway fora Home Automation System, 2015, pp. 1-4. https://ieeexplore.ieee.org/stamp/stamp.jsp?tp=&arnumber=7434213 (Year: 2015).*

Cheng-Ting Lee, A Smart Energy System with Distributed Access Control, 2014, pp. 1-8. https://ieeexplore.ieee.org/stamp/stamp.jsp?tp=arnumber=7059642 (Year: 2014).*

Erkki Moorits, Low Resource Demanding FOTA Method for Remote AtoN Site Equipment, 2010, pp. 1-5. https://ieeexplore.ieee.org/stamp/stamp.jsp?tp=&arnumber=5664107 (Year: 2010).*

Marko Malajner, Online programmable wireless sensor node for testing purpose, 2008, pp. 1-4. https://ieeexplore.ieee.org/stamp/stamp.jsp?tp=arnumber=6918928 (Year: 2008).*

International Search Report in International Application No. PCT/CN2016/092108, dated Feb. 7, 2017.

Extended Search Report for European Application No. 17171821.6 from the European Patent Office, dated Oct. 24, 2017.

Summons to Attend Oral Proceedings dated Feb. 11, 2019, in counterpart European Application No. 17171821.6.

Gateway (telecommunications), May 18, 2016, available at https://en.wikipedia.org/w/index.php?title=Gateway_(telecommunications)&oldid=720943321, [retrieved on Jan. 14, 2019].

* cited by examiner

300

METHOD, APPARATUS, AND COMPUTER-READABLE STORAGE MEDIUM FOR UPGRADING A ZIGBEE DEVICE

CROSS-REFERENCE TO RELATED APPLICATION

This application is based on and claims priority to Chinese Patent Application No. 201610356502.7, filed on May 25, 2016, the entire content of which is incorporated herein by reference in its entirety.

FIELD

The present disclosure relates to a technical field of communication, and more particularly, to a method, apparatus, and computer-readable storage medium for upgrading a ZigBee device.

BACKGROUND

ZigBee is a wireless communication protocol. Compared with WiFi, ZigBee has the advantages of convenient network deployment and low power consumption, and is widely used in situations involving a large network size and a high requirement for power consumption. However, due to a low transmission rate between devices using a ZigBee protocol, it usually takes a long time to upgrade a ZigBee device in a network deployed with ZigBee devices.

For example, when a ZigBee device upgrades its firmware, the upgrade may be triggered manually by a user after a version of the firmware is updated, and then the ZigBee device may perform protocol conversion through an intelligent gateway integrating a Wi-Fi module with a ZigBee module, such that the ZigBee device can access the Internet to communicate with a cloud server, thus downloading the updated version of the firmware and completing the upgrade.

Due to a low transmission rate of the communication between devices using the ZigBee protocol, for example, at a maximum rate of 250 kb/s, it may take a long time to upgrade the firmware of a ZigBee device in a network deployed with ZigBee devices. Therefore, the user often needs to wait a long time, which may impact user experience.

SUMMARY

According to a first aspect of the present disclosure, there is provided a method for upgrading a ZigBee device, comprising: downloading, when firmware of the ZigBee device needs to be upgraded, a latest version of the firmware from a server; pushing the latest version of the firmware to the ZigBee device; and issuing a firmware upgrade instruction to the ZigBee device after the latest version of the firmware is pushed to the ZigBee device successfully, to trigger the firmware of the ZigBee device to be upgraded based on the latest version of the firmware.

According to a second aspect of the present disclosure, there is provided an apparatus for upgrading a ZigBee device, comprising: a processor; and a memory for storing instructions executable by the processor; wherein the processor is configured to: download, when firmware of the ZigBee device needs to be upgraded, a latest version of the firmware from a server; push the latest version of the firmware to the ZigBee device; and issue a firmware upgrade instruction to the ZigBee device after the latest version of the firmware is pushed to the ZigBee device successfully, to trigger the firmware of the ZigBee device to be upgraded based on the latest version of the firmware.

According to a third aspect of the present disclosure, there is provided a non-transitory computer-readable storage medium having stored thereon instructions that, when executed by a processor of an apparatus, cause the apparatus to perform a method for upgrading a ZigBee device, the method comprising: downloading, when firmware of the ZigBee device needs to be upgraded, a latest version of the firmware from a server; pushing the latest version of the firmware to the ZigBee device; and issuing a firmware upgrade instruction to the ZigBee device after the latest version of the firmware is pushed to the ZigBee device successfully, to trigger the firmware of the ZigBee device to be upgraded based on the latest version of the firmware.

It is to be understood that the above general description and the following detailed description are merely for the purpose of illustration and explanation, and are not intended to limit the scope of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to example embodiments, examples of which are illustrated in the accompanying drawings. The following description refers to the accompanying drawings in which same numbers in different drawings represent same or similar elements unless otherwise described. The implementations set forth in the following description of example embodiments do not represent all implementations consistent with the present disclosure. Instead, they are merely examples of apparatuses and methods consistent with aspects related to the present disclosure as recited in the appended claims.

Exemplary embodiments of the present disclosure provide a silent upgrade mechanism for a ZigBee device, which may include: downloading, when firmware of the ZigBee device needs to be upgraded, a latest version of the firmware from a server; pushing the latest version of the firmware which has been downloaded to the ZigBee device; and issuing a firmware upgrade instruction to the ZigBee device after the latest version of the firmware is pushed to the ZigBee device successfully, to trigger the firmware of the ZigBee device to be upgraded based on the latest version of the firmware. Thus, the silent implementation of downloading the latest version of the firmware of the ZigBee device and upgrading the firmware based on the latest version of the firmware may be achieved without a user being aware, so as to avoid the problem that the user waits for a long time to upgrade a ZigBee device due to a low transmission rate between ZigBee devices, which may improve user experience.

Figure 1:
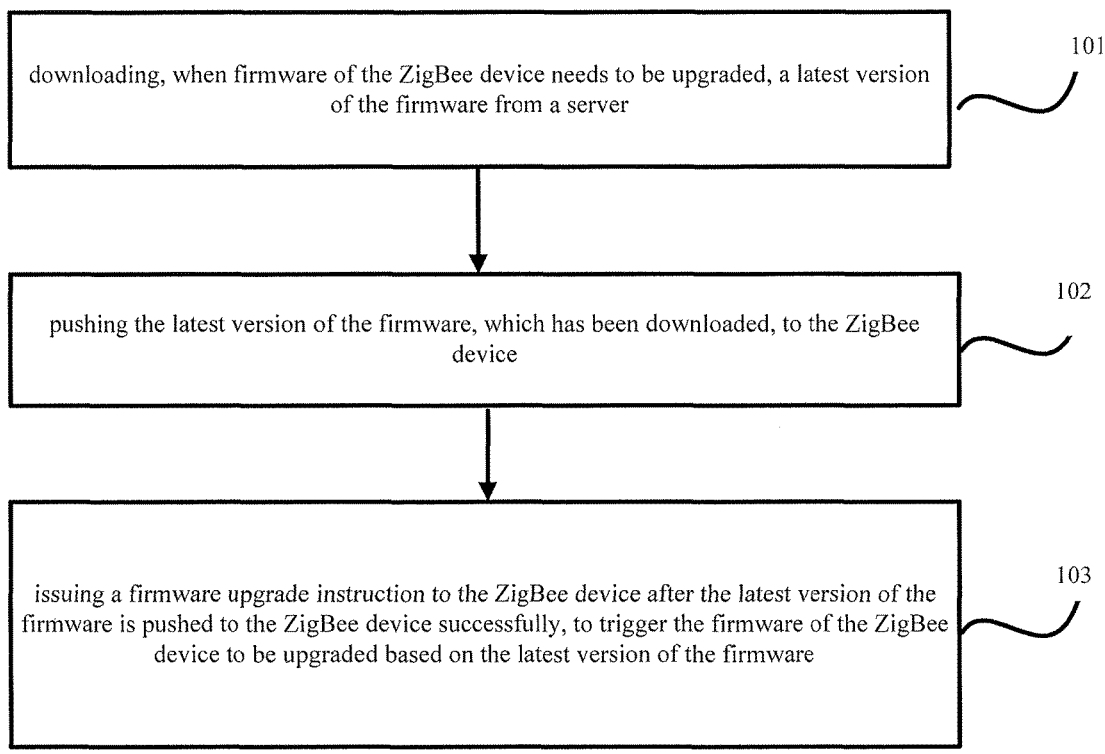
FIG. 1 is a flowchart of a method for upgrading a ZigBee device according to an exemplary embodiment.

FIG. 1 is a flowchart of a method 100 for upgrading a ZigBee device according to an exemplary embodiment. The method 100 may be applied to an intelligent gateway, and includes following steps.

In step 101, when firmware of the ZigBee device needs to be upgraded, a latest version of the firmware is downloaded from a server.

In step 102, the latest version of the firmware, which has been downloaded, is pushed to the ZigBee device.

In step 103, a firmware upgrade instruction is issued to the ZigBee device after the latest version of the firmware is pushed to the ZigBee device successfully, to trigger the firmware of the ZigBee device to be upgraded based on the latest version of the firmware.

The ZigBee device may be an intelligent device, also referred to as a smart device, running a ZigBee protocol and communicating based on the ZigBee protocol. For example, the ZigBee device may be a wireless doorbell button, a human infrared motion sensor, a door and window sensor, or other kinds of intelligent devices which are deployed in a household environment with a low power consumption to communicate based on the ZigBee protocol.

The server may be a general server, a server cluster deployed on the cloud, or a cloud platform constructed based on a server cluster. The server is configured to store the latest version of firmware required when the firmware of the ZigBee device is upgraded.

the intelligent gateway may be a gateway device integrating a WiFi module with a ZigBee module, for example, an intelligent router or server. The WiFi module of the intelligent gateway device may communicate with the ZigBee module via, e.g., a series port. The WiFi module may access to Internet through WiFi to communicate data with a cloud server. In some embodiments, the intelligent gateway may be used as a key device and deployed in an application environment constructed based on ZigBee devices (e.g., an intelligent household environment with low power consumption). A ZigBee device in this application environment may perform protocol conversion using the WiFi module and the ZigBee module of the intelligent gateway to access to Internet, so as to communicate data with the cloud server.

In the exemplary embodiment, after the ZigBee device leaves a factory, the firmware of the ZigBee device may have some defects, or the ZigBee device may need to add a new function in a practical application. Accordingly, there exists a demand of upgrading the firmware for the ZigBee device. The method 100 provides the silent implementation of downloading the latest version of the firmware of the ZigBee device and upgrading the firmware based on the latest version of the firmware, which may be achieved without the user being aware, and may improve user experience.

In one exemplary embodiment, the ZigBee device operates in an intelligent household environment, in which intelligent devices are required to have low power consumption. Compared with WiFi, the ZigBee protocol has the advantage of low power consumption, so the intelligent devices supporting the ZigBee protocol and communicating based on the ZigBee protocol may be used to construct the intelligent household environment with low power consumption. For example, the intelligent household environment may be Xiaorni Inc.'s "intelligent home security suite," which includes an intelligent gateway, and one or more of a wireless doorbell button, a human infrared motion sensor, and a door and window sensor communicating based on the ZigBee protocol.

In the exemplary embodiment, the intelligent devices in the intelligent household environment support communicating with the ZigBee module of the intelligent gateway via the ZigBee protocol, so the intelligent gateway may communicate with each of the ZigBee devices via the ZigBee module to acquire a current version of the firmware of the ZigBee device.

Meanwhile, the intelligent gateway may communicate with the server via the WiFi module to query for the latest version of the firmware of each ZigBee device.

In one exemplary embodiment, the intelligent gateway may send a query command to the server for querying the latest version of the firmware of each ZigBee device, and then the latest version of the firmware of each ZigBee device may be acquired by acquiring a returned response command from the server.

The query command may carry a type identification of the ZigBee device to be queried and the current version of the firmware of the ZigBee device. After receiving the query command, the server may compare the current version of the firmware of the ZigBee device carried by the query command with the latest version of the firmware of the ZigBee device stored locally. If the current version is the latest version, it indicates that the firmware of the ZigBee device is already the latest version and does not need to be upgraded, and the server may not respond to the query command or just return a null value. If the current version is not the latest version, it indicates that the ZigBee device needs to upgrade the current version of the firmware, and the server may respond to the query command normally and return a corresponding response command to the intelligent gateway. The response command may carry a query result corresponding to the query command, which may carry the type identification and the latest version of the firmware of the ZigBee device. In addition, in some embodiments, the response command may also carry a download address of the latest version of the firmware to facilitate the intelligent gateway to download the latest version of the firmware based on the download address.

For example, in one exemplary embodiment, a format of the query command may be as follows:

{method:
get_subdev_version,params:
[string(model),string(fw_version)]}

A format of the response command may be as follows:

{result:
[model:lumi.xxx.xxx,
fw_version:xxx,
hw_version:xxx,
url:http://xxx.ota.bin,md5:xxx,des:xxx]}

In the above exemplary query command and response command, the parameter "model" represents the type identification of the ZigBee device for which the intelligent gateway sends the query command, for uniquely identifying the ZigBee device; the parameter "fw_version" represents the current version of the firmware of the ZigBee device; the parameter "hw_version" represents the latest version of the firmware of the ZigBee device; and the parameter "url" represents the download address of the latest version of the firmware.

In addition, the intelligent gateway may send the query command regularly based on a set sending time, for example, the sending time may be 10 p.m. every day. The set sending time may be selected from a preset period of time randomly, for example, the preset period of time may be set based on a characteristic of a working time of the server. For example, if a system maintenance time of the server is from 10 p.m. to 6 a.m. every day, during which the server's daily service communication with other devices is suspended, the preset period of time may be set to from 6 a.m. to 10 p.m., during which the server can perform the daily service communication. Furthermore, a sending time may be selected from the preset period of time randomly to send the query command when the intelligent gateway sets the sending time. Because the server usually serves multiple intelligent gateways, if all of the intelligent gateways send query commands based on the same sending time for upgrading the ZigBee devices connected with the intelligent gateways, upgrade congestion may be caused by intensive data accesses at that sending time. Therefore, selecting the sending time randomly may ensure to diversify the sending time for sending the query command by each intelligent gateway, so as to avoid upgrade congestion.

In the exemplary embodiment, after receiving the response command returned from the server, the intelligent gateway may read the latest version of the firmware of the ZigBee device carried in the response command and compare it with the current version of the firmware of the ZigBee device, to determine whether the current version of the firmware of the ZigBee device is the same as the latest version of the firmware. If the current version of the firmware of the ZigBee device is the same as the latest version of the firmware, it indicates that the firmware of the ZigBee device does not need to be upgraded and, in this case, the ZigBee device may be initiated and operated using the current version of the firmware without special treatments.

If the current version of the firmware of the ZigBee device is not the latest version of the firmware, the intelligent gateway may download the latest version of the firmware from the download address of the latest version of the firmware carried in the response command.

after the intelligent gateway downloads the latest version of the firmware successfully, the latest version of the firmware may be pushed to the corresponding ZigBee device. The intelligent gateway may push the latest version of the firmware to the ZigBee device actively or passively. For example, the intelligent gateway may push the latest version of the firmware to the ZigBee device immediately after the latest version of the firmware is downloaded successfully. Also for example, the ZigBee device may send a query message to the intelligent gateway regularly to query if the intelligent gateway has stored the latest version of the firmware, and after the intelligent gateway downloads the latest version of the firmware successfully and receives the query message from the ZigBee device, it can send the downloaded latest version of the firmware to the ZigBee device.

In the exemplary embodiment, each ZigBee device may store the latest version of the firmware pushed by the intelligent gateway in the background and, after receiving the latest version of the firmware pushed by the intelligent gateway, each ZigBee device may store the received firmware in a backup storage of a microcontroller unit (MCU) of the ZigBee device such that the current normal operation is not affected.

After pushing the latest version of the firmware to each ZigBee device successfully, the intelligent gateway may issue a firmware upgrade instruction to each ZigBee device which needs to be upgraded, and the ZigBee device may upgrade the firmware based on the latest version of the firmware stored locally after receiving the latest version of the firmware pushed by the intelligent gateway.

When upgrading the firmware based on the latest version of the firmware, the ZigBee device may output a prompt message to the user via a system interface, for example, the prompt message may be "upgrade to the latest version of the firmware or not", and the user may start the firmware upgrade by triggering a upgrade icon on the system interface.

In the process of upgrading the firmware, the ZigBee device may perform a restart operation. During a restart process, the ZigBee device may read the latest version of the firmware, and replace or update the current version of the firmware stored in the MCU of the device. After the restart process is completed, the ZigBee device may operate the latest version of the firmware, and the firmware upgrade is completed.

When the ZigBee device receives the firmware upgrade instruction issued by the intelligent gateway, the latest version of the firmware has been downloaded locally in advance and the user may not be aware of the download process, so the ZigBee device may complete the firmware upgrade immediately using the latest version of the firmware stored locally. In this manner, the user needs not wait for upgrade, due to the ZigBee device's automatic and immediate response to the upgrade process, which may improve user experience.

In the method 100, a silent implementation of downloading the latest version of the firmware of the ZigBee device and upgrading the firmware based on the latest version of the firmware may be achieved without the user being aware, so as to avoid the problem in conventional methods that the user may wait for a long time to upgrade a ZigBee device due to a low transmission rate between ZigBee devices, which may improve user experience.

Figure 2:
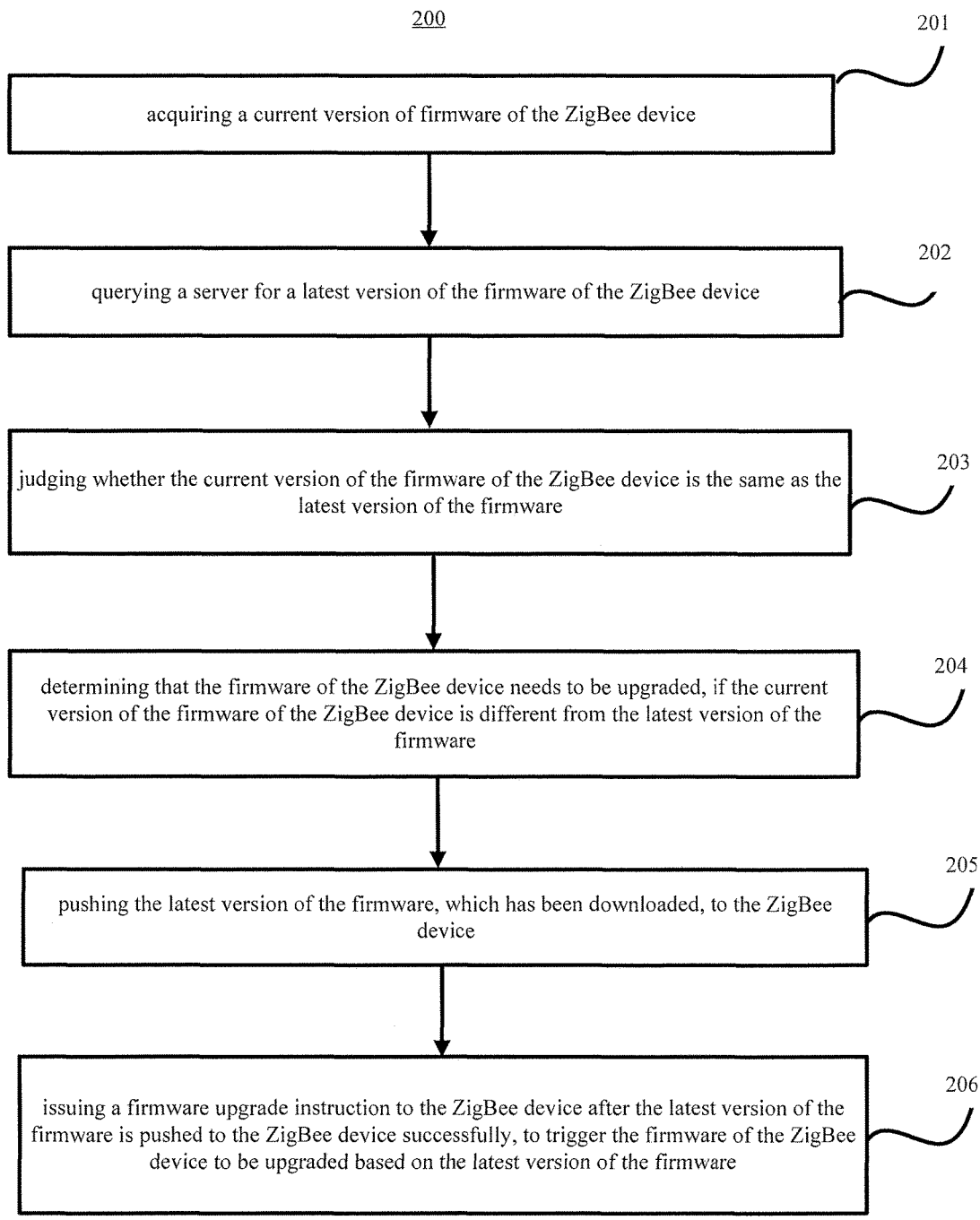
FIG. 2 is a flowchart of a method for upgrading a ZigBee device according to an exemplary embodiment.

FIG. 2 is a flowchart of a method 200 for upgrading a ZigBee device according to an exemplary embodiment. The method 200 may be applied to an intelligent gateway, and includes following steps.

In step 201, a current version of firmware of the ZigBee device is acquired.

In step 202, a server is queried for a latest version of the firmware of the ZigBee device.

In step 203, whether the current version of the firmware of the ZigBee device is the same as the latest version of the firmware is judged.

In step 204, if the current version of the firmware of the ZigBee device is different from the latest version of the firmware, it is determined that the firmware of the ZigBee device needs to be upgraded.

In step 205, the latest version of the firmware, which has been downloaded, is pushed to the ZigBee device.

In step 206, a firmware upgrade instruction is issued to the ZigBee device after the latest version of the firmware is pushed to the ZigBee device successfully, to trigger the firmware of the ZigBee device to be upgraded based on the latest version of the firmware.

The ZigBee device may be an intelligent device running the ZigBee protocol and communicating based on a ZigBee protocol. For example, the ZigBee device may be a wireless doorbell button, a human infrared motion sensor, a door and window sensor, or other kinds of intelligent devices which are deployed in a household environment with low power consumption to communicate based on the ZigBee protocol.

The server may be a general server, a server cluster deployed on the cloud, or a cloud platform constructed based on a server cluster. The server is configured to store the latest version of the firmware required when the firmware of the ZigBee device is upgraded.

The intelligent gateway may be a gateway device integrating a WiFi module with a ZigBee module, for example, an intelligent router or server. The WiFi module of the intelligent gateway device may communicate with the ZigBee module via, e.g., a serial port. The WiFi module may access to Internet via WiFi to communicate data with a cloud server. In some embodiments, the intelligent gateway may be used as a key device and deployed in an application environment constructed based on ZigBee devices (e.g., the intelligent household environment with low power consumption). The ZigBee device in this application environment may perform protocol conversion using the WiFi module and the ZigBee module of the intelligent gateway to access to Internet, so as to communicate data with the cloud server.

In the exemplary embodiment, after the ZigBee device leaves a factory, the firmware of the ZigBee device may have some defects, or the ZigBee device may need to add a new function in a practical application. Accordingly, there exists a demand of upgrading the firmware for the ZigBee device. The method 200 provides the silent implementation of downloading the latest version of the firmware of the ZigBee device and upgrading the firmware based on the latest version of the firmware, which may be achieved without the user being aware, may improve user experience.

In one exemplary embodiment, the ZigBee device operates in an intelligent household environment, in which intelligent devices are required to have low power consumption. Compared with WiFi, the ZigBee protocol has the advantage of low power consumption, so the intelligent devices supporting the ZigBee protocol and communicating based on the ZigBee protocol may be used to construct the intelligent household environment with low power consumption. For example, the intelligent household environment may be Xiaomi Inc.'s "intelligent home security suite," which includes an intelligent gateway, and one or more of a wireless doorbell button, a human infrared motion sensor, and a door and window sensor communicating based on the ZigBee protocol.

In the exemplary embodiment, the intelligent devices in the intelligent household environment support communicating with the ZigBee module of the intelligent gateway via the ZigBee protocol, so the intelligent gateway may communicate with each of the ZigBee devices via the ZigBee module to acquire a current version of the firmware of the ZigBee device.

Meanwhile, the intelligent gateway may also communicate with the server via the WiFi module to query for the latest version of the firmware of each ZigBee device.

In one exemplary embodiment, the intelligent gateway may send a query command to the server for querying the latest version of the firmware of each ZigBee device, and then the latest version of the firmware of each ZigBee device may be acquired by acquiring a returned response command from the server.

The query command may carry a type identification of the ZigBee device to be queried and the current version of the firmware of the ZigBee device. After receiving the query command, the server may compare the current version of the firmware of the ZigBee device carried by the query command with the latest version of the firmware of the ZigBee device stored locally. If the current version is the latest version, it indicates that the firmware of the ZigBee device is already the latest version and does not need to be upgraded, and the server may not respond to the query command or just return a null value. If the current version is not the latest version, it indicates that the ZigBee device needs to upgrade the current version of the firmware, and the server may respond to the query command normally and return a corresponding response command to the intelligent gateway. The response command may carry a query result corresponding to the query command, which may carry the type identification and the latest version of the firmware of the ZigBee device. In addition, in some embodiments, the response command may also carry a download address of the latest version of the firmware to facilitate the intelligent gateway to download the latest version of the firmware based on the download address.

For example, in one exemplary embodiment, a format of the query command may be as follows:

{method:
get_subdev_version, params:
[string(model),string(fw_version)]}

A format of the response command may be as follows:

{result:
[model:lumi.xxx.xxx,
fw_version:xxx,
hw_version:xxx,
url:http://xxx.ota.bin,md5:xxx,des:xxx]}

In the above exemplary query command and response command, the parameter "model" represents the type identification of the ZigBee device for which the intelligent gateway sends the query command, for uniquely identifying the ZigBee device; the parameter "fw_version" represents the current version of the firmware of the ZigBee device; the parameter "hw_version" represents the latest version of the firmware of the ZigBee device; and the parameter "url" represents the download address of the latest version of the firmware.

In addition, the intelligent gateway may send the query command regularly based on a set sending time, for example, the sending time may be 10 p.m. every day. The set sending time may be selected from a preset period of time randomly, for example, the preset period of time may be set based on a characteristic of a working time of the server. For example, if a system maintenance time of the server is from 10 p.m. to 6 a.m. every day, during which the server's daily service communication with other devices is suspended, the preset period of time may be set to from 6 a.m. to 10 p.m., during which the server can perform the daily service communication. Furthermore, a sending time may be selected from the preset period of time randomly to send the query command when the intelligent gateway sets the sending time. Because the server usually serves multiple intelligent gateways, if all of the intelligent gateways send query commands based on the same sending time for upgrading the ZigBee devices connected with the intelligent gateways, upgrade congestion may be caused by intensive data accesses at that sending time. Therefore, selecting the sending time randomly may ensure to diversify the sending time for sending the query command by each intelligent gateway, so as to avoid upgrade congestion.

In the exemplary embodiment, after receiving the response command returned from the server, the intelligent gateway may read the latest version of the firmware of the ZigBee device carried in the response command and compare it with the current version of the firmware of the ZigBee device, to determine whether the current version of the firmware of the ZigBee device is the same as the latest version of the firmware. If the current version of the firmware of the ZigBee device is the same as the latest version of the firmware, it indicates that the firmware of the ZigBee device does not need to be upgraded and, in this case, the ZigBee device may be initiated and operated using the current version of the firmware without special treatments.

If the current version of the firmware of the ZigBee device is not the latest version of the firmware, the intelligent gateway may download the latest version of the firmware from the download address of the latest version of the firmware carried in the response command.

After the intelligent gateway downloads the latest version of the firmware successfully, the latest version of the firmware may be pushed to the corresponding ZigBee device. The intelligent gateway may push the latest version of the firmware to the ZigBee device actively or passively. For example, the intelligent gateway may push the latest version of the firmware to the ZigBee device immediately after the latest version of the firmware is downloaded successfully. Also for example, the ZigBee device may send a query message to the intelligent gateway regularly to query if the intelligent gateway has stored the latest version of the firmware, and after the intelligent gateway downloads the latest version of the firmware successfully and receives the query message from the ZigBee device, it can send the downloaded latest version of the firmware to the ZigBee device.

In the exemplary embodiment, each ZigBee device may store the latest version of the firmware pushed by the intelligent gateway in the background and, after receiving the latest version of the firmware pushed by the intelligent gateway, each ZigBee device may store the received firmware in a backup storage of an MCU of the ZigBee device such that the current normal operation is not affected.

After pushing the latest version of the firmware to each ZigBee device successfully, the intelligent gateway may issue a firmware upgrade instruction to each ZigBee device which needs to be upgraded, and the ZigBee device may upgrade the firmware based on the latest version of the firmware stored locally after receiving the latest version of the firmware pushed by the intelligent gateway.

When upgrading the firmware based on the latest version of the firmware, the ZigBee device may output a prompt message to the user via a system interface, for example, the prompt message may be "upgrade to the latest version of the firmware or not", and the user may start the firmware upgrade by triggering an upgrade icon on the system interface.

In the process of upgrading the firmware, the ZigBee device may perform a restart operation. During a restart process, the ZigBee device may read the latest version of the firmware, and replace or update the current version of the firmware stored in the MCU of the device. After the restart process is completed, the ZigBee device may operate the latest version of the firmware, and the firmware upgrade is completed.

In the method 200, when the ZigBee device receives the firmware upgrade instruction issued by the intelligent gateway, the latest version of the firmware has already downloaded locally and the user may not be aware of the download process. Accordingly, the ZigBee device may complete the firmware upgrade immediately using the latest version of the firmware stored locally. The user does not need to wait for upgrade, due to the ZigBee device's automatic and immediate response to the upgrade process, which may improve user experience.

Figure 3:
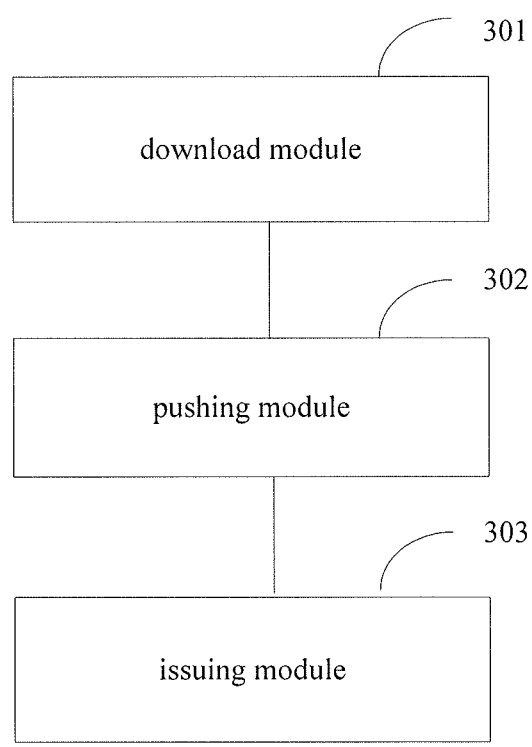
FIG. 3 is a block diagram of an apparatus for upgrading a ZigBee device according to an exemplary embodiment.

FIG. 3 is a block diagram of an apparatus 300 for upgrading a ZigBee device according to an exemplary embodiment. As shown in FIG. 3, the apparatus 300 includes a download module 301, a pushing module 302, and an issuing module 303.

The download module 301 is configured to download, when firmware of the ZigBee device needs to be upgraded, a latest version of the firmware from a server.

The pushing module 302 is configured to push the latest version of the firmware, which has been downloaded, to the ZigBee device.

The issuing module 303 is configured to issue a firmware upgrade instruction to the ZigBee device after the latest version of the firmware is pushed to the ZigBee device successfully, to trigger the firmware of the ZigBee device to be upgraded based on the latest version of the firmware.

Using the apparatus 300, a silent implementation of downloading the latest version of the firmware of the ZigBee device and upgrading the firmware based on the latest version of the firmware may be achieved without the user being aware, so as to avoid the problem in conventional methods that the user waits for a long time to upgrade a ZigBee device due to a low transmission rate between ZigBee devices, which may improve user experience.

Figure 4:
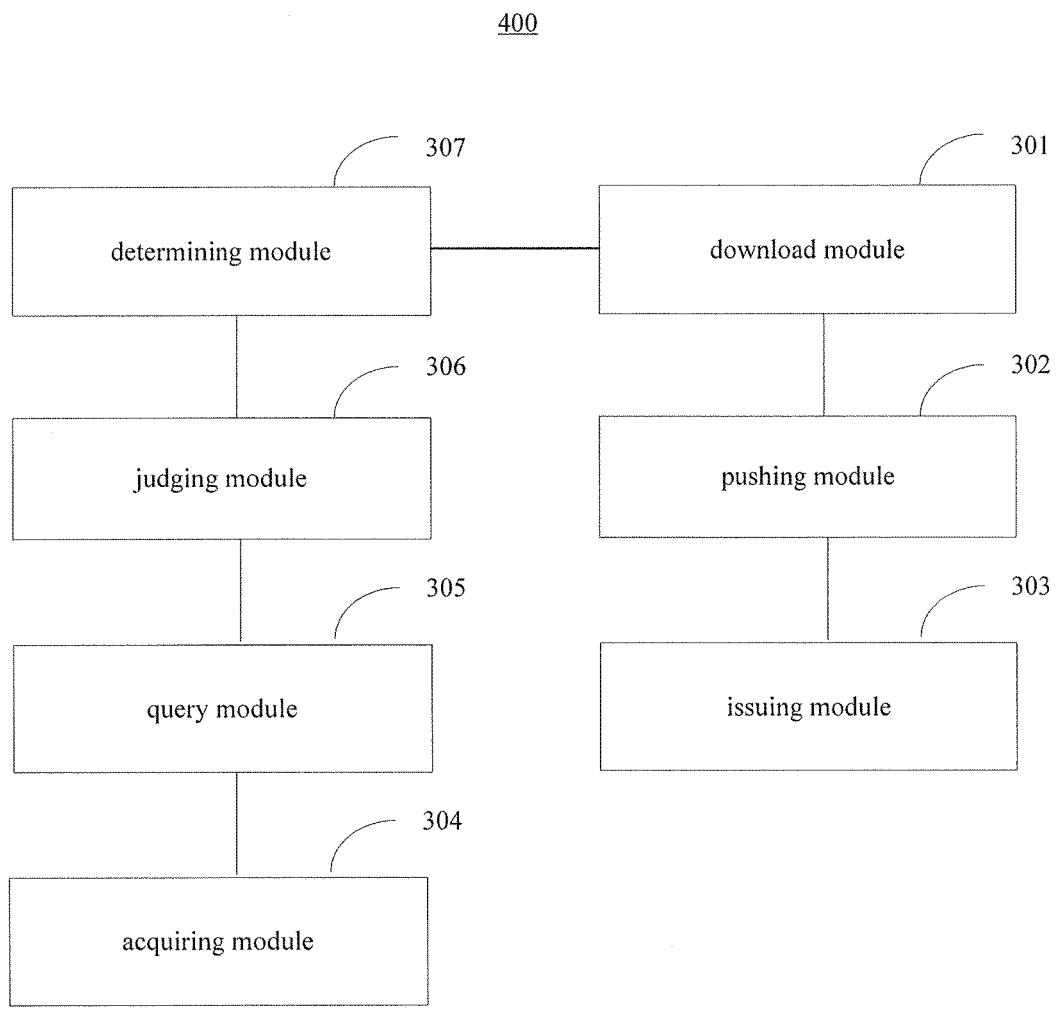
FIG. 4 is a block diagram of an apparatus for upgrading a ZigBee device according to an exemplary embodiment.

FIG. 4 is a block diagram of an apparatus 400 for upgrading a ZigBee device according to another exemplary embodiment. The apparatus 400 may further include an acquiring module 304, a query module 305, a judging module 306, and a determining module 307, in addition to the download module 301, the pushing module 302, and the issuing module 303 (FIG. 3).

The acquiring module 304 is configured to acquire a current version of the firmware of the ZigBee device.

the query module 305 is configured to query the server for the latest version of the firmware of the ZigBee device.

the judging module 306 is configured to judge whether the current version of the firmware of the ZigBee device is the same as the latest version of the firmware.

the determining module 307 is configured to determine that the firmware of the ZigBee device needs to be upgraded, if the current version of the firmware of the ZigBee device is different from the latest version of the firmware.

Figure 5:
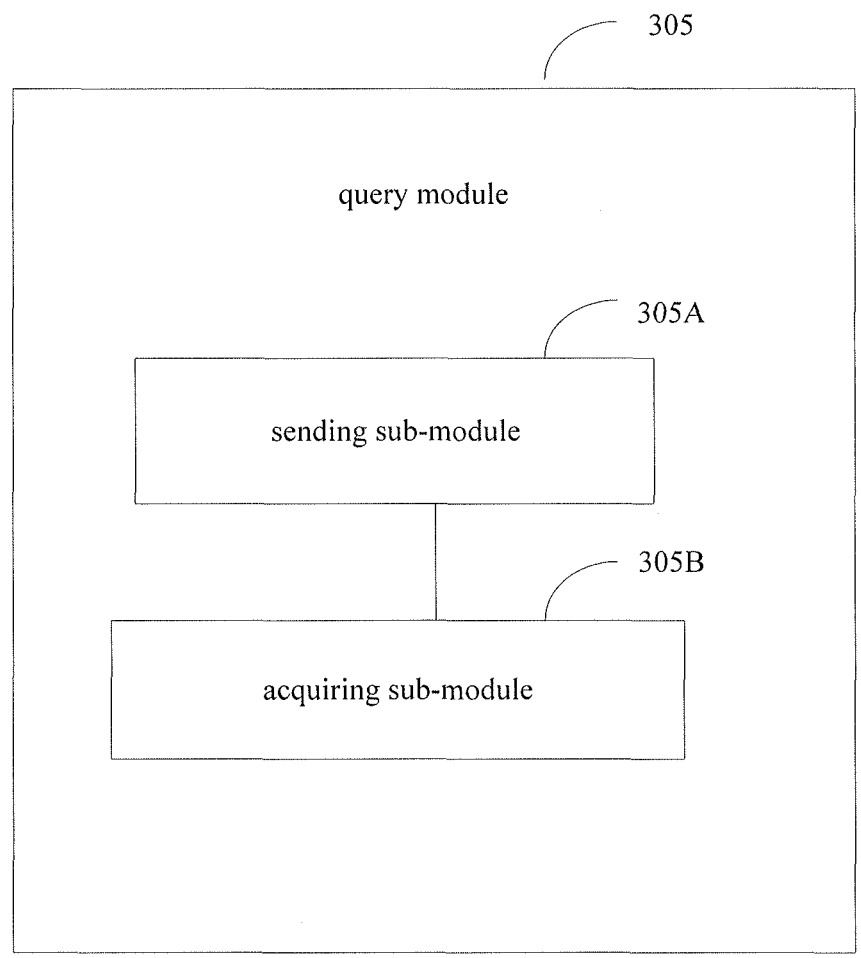
FIG. 5 is a block diagram of a query module according to an exemplary embodiment.

FIG. 5 is a block diagram of the query module 305 (FIG. 4), according to an exemplary embodiment. The query module 305 may include a sending sub-module 305A and an acquiring sub-module 305B.

The sending sub-module 305A is configured to send a query command for querying the latest version of the firmware to the server regularly based on a set sending time. For example, the set sending time is selected from a preset period of time randomly.

The acquiring sub-module 305B is configured to acquire a query result returned from the server, which corresponds to the query command, and the query result includes the latest version of the firmware.

Figure 6:
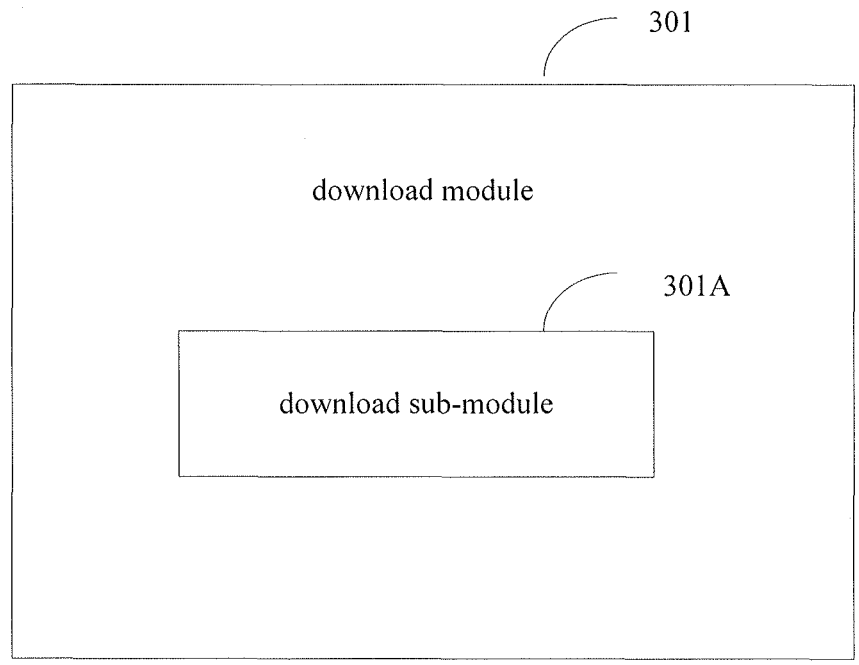
FIG. 6 is a block diagram of a download module according to an exemplary embodiment.

FIG. 6 is a block diagram of the download module 301 (FIG. 4) according to an exemplary embodiment. In the exemplary embodiment, the query result may further include a download address corresponding to the latest version of the firmware. The download module 301 may include a download sub-module 301A configured to download the latest version of the firmware from the server based on the download address.

The above-described embodiments of apparatus are for illustrative purposes only. The modules described as separate components may or may not be physically separated, and these components may be located in the same place or be distributed in a network.

Exemplary embodiments of the present disclosure also provide an apparatus for upgrading a ZigBee device. The apparatus may include a processor; and a memory for storing instructions executable by the processor. The processor is configured to: download, when firmware of the ZigBee device needs to be upgraded, a latest version of the firmware from a server; push the latest version of the firmware which has been downloaded to the ZigBee device; and issue a firmware upgrade instruction to the ZigBee device after the latest version of the firmware is pushed to the ZigBee device successfully, to trigger the firmware of the ZigBee device to be upgraded based on the latest version of the firmware. For example, the apparatus may be an intelligent gateway.

Figure 7:
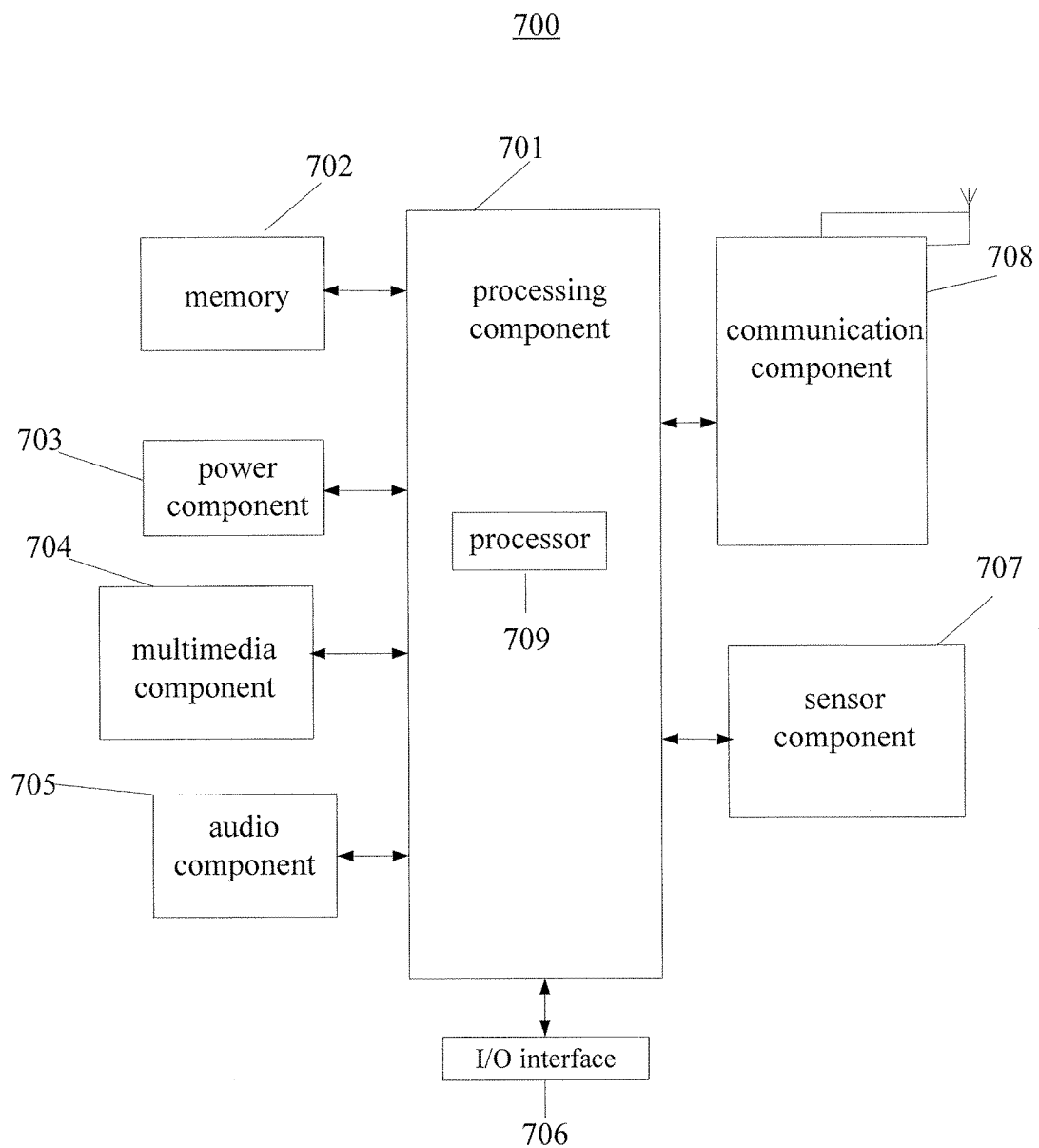
FIG. 7 is a block diagram of an apparatus for upgrading a ZigBee device according to an exemplary embodiment.

FIG. 7 is a block diagram of an apparatus 700 for upgrading a ZigBee device according to an exemplary embodiment. For example, the apparatus 700 may be a mobile phone, a computer, a digital broadcast terminal, a messaging device, a gaming console, a tablet, a medical device, an exercise equipment, a personal digital assistant, and the like.

Referring to FIG. 7, the apparatus 700 may include one or more of the following components: a processing component 701, a memory 702, a power component 703, a multimedia component 704, an audio component 705, an input/output (I/O) interface 706, a sensor component 707, and a communication component 708.

The processing component 701 typically controls overall operations of the apparatus 700, such as the operations associated with display, telephone calls, data communications, camera operations, and recording operations. The processing component 701 may include one or more processors 709 to execute instructions to perform all or part of the steps in the above described methods. Moreover, the processing component 701 may include one or more modules which facilitate the interaction between the processing component 701 and other components. For instance, the processing component 701 may include a multimedia module to facilitate the interaction between the multimedia component 704 and the processing component 701.

The memory 702 is configured to store various types of data to support the operation of the apparatus 700. Examples of such data include instructions for any applications or methods operated on the apparatus 700, contact data, phonebook data, messages, pictures, video, etc. The memory 702 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 703 provides power to various components of the apparatus 700. The power component 703 may include a power management system, one or more power sources, and any other components associated with the generation, management, and distribution of power for the apparatus 700.

the multimedia component 704 includes a screen providing an output interface between the apparatus 700 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 704 includes a front camera and/or a rear camera. The front camera and the rear camera may receive an external multimedia datum while the apparatus 700 is in an operation mode, such as a photographing mode or a video mode. Each of the front camera and the rear camera may be a fixed optical lens system or have optical focusing and zooming capability.

the audio component 705 is configured to output and/or input audio signals. For example, the audio component 705 includes a microphone configured to receive an external audio signal when the apparatus 700 is in an operation mode, such as a call mode, a recording mode, and a voice recognition mode. The received audio signal may be further stored in the memory 702 or transmitted via the communication component 708. In some embodiments, the audio component 705 further includes a speaker to output audio signals.

The I/O interface 706 provides an interface between the processing component 701 and peripheral interface modules, the peripheral interface modules being, for example, a keyboard, a click wheel, buttons, and the like. The buttons may include, but are not limited to, a home button, a volume button, a starting button, and a locking button.

The sensor component 707 includes one or more sensors to provide status assessments of various aspects of the apparatus 700. For instance, the sensor component 707 may detect an open/closed status of the apparatus 700, relative positioning of components (e.g., the display and the keypad) of the apparatus 700, a change in position of the apparatus 700 or a component of the apparatus 700, a presence or absence of user contact with the apparatus 700, an orientation or an acceleration/deceleration of the apparatus 700, and a change in temperature of the apparatus 700. The sensor component 707 may include a proximity sensor configured to detect the presence of a nearby object without any physical contact. The sensor component 707 may also include a light sensor, such as a CMOS or CCD image sensor, for use in imaging applications. In some embodiments, the sensor component 707 may also include an accelerometer sensor, a gyroscope sensor, a magnetic sensor, a pressure sensor, or a temperature sensor.

The communication component 708 is configured to facilitate communication, wired or wirelessly, between the apparatus 700 and other devices. The apparatus 700 can access a wireless network based on a communication standard, such as ZigBee, WiFi, 2G, 3G, 4G, or a combination thereof. In an exemplary embodiment, the communication component 708 receives a broadcast signal or broadcast associated information from an external broadcast management system via a broadcast channel. In an exemplary embodiment, the communication component 708 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 702, executable by the processor 709 in the apparatus 700, for performing the above-described methods. For example, the non-transitory computer-readable storage medium may be a ROM, a RAM, a CD-ROM, a magnetic tape, a floppy disc, an optical data storage device, and the like.

The instructions stored in the storage medium, when executed by the processor 709, cause the apparatus 700 to perform a method for upgrading a ZigBee device. The method may include: downloading, when firmware of the ZigBee device needs to be upgraded, a latest version of the firmware from a server; pushing the latest version of the firmware which has been downloaded to the ZigBee device; and issuing a firmware upgrade instruction to the ZigBee device after the latest version of the firmware is pushed to the ZigBee device successfully, to trigger the firmware of the ZigBee device to be upgraded based on the latest version of the firmware.

Figure 8:
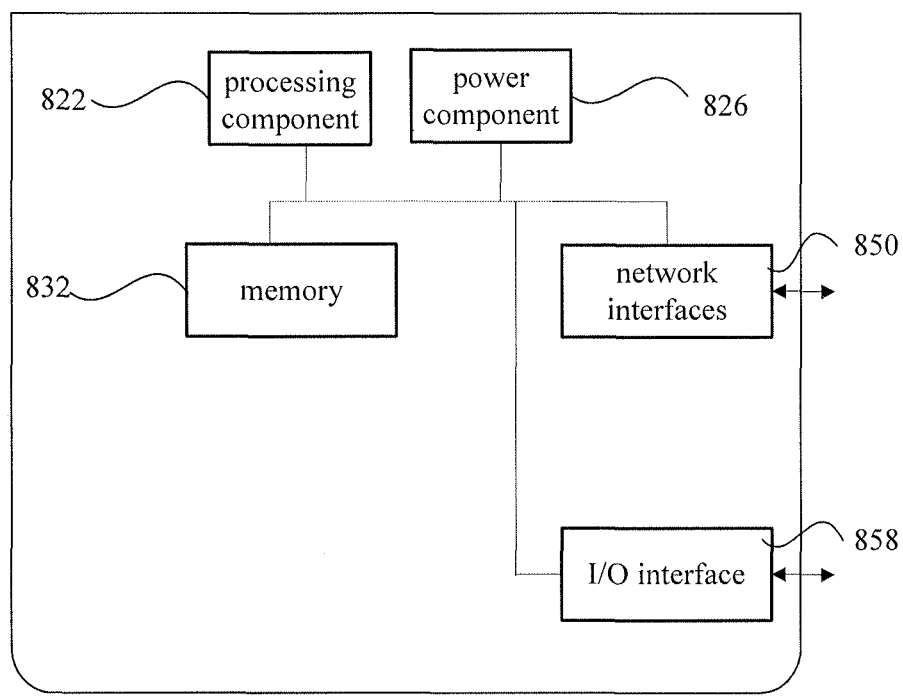
FIG. 8 is a block diagram of an apparatus for upgrading a ZigBee device according to an exemplary embodiment.

FIG. 8 is a block diagram of an apparatus 800 for upgrading a ZigBee device according to an exemplary embodiment. For example, the apparatus 800 may be implemented as an intelligent gateway or a server. As shown in FIG. 8, the apparatus 800 may include a processing component 822 having one or more processors, and storage resources represented by a memory 832 for storing firmware and instructions, e.g., application programs, executable by the processing component 822. Further, the processing component 822 is configured to execute instructions to perform the above-described methods for upgrading a ZigBee device.

The apparatus 800 may also include a power component 826 to perform power management of the apparatus 800, a wired or wireless network interfaces 850 to connect the apparatus 800 to a network, and an input/output (I/O) interface 858.

The apparatus 800 may operate based on an independent operating system stored in the memory 832, such as Windows Server™, Mac OS X™, Unix™, Linux™, FreeBSD™, or the like.

The instructions stored in the storage 832, when executed by the processing component 822, cause the apparatus 800 to perform a method for upgrading a ZigBee device. The method includes: downloading, when firmware of the ZigBee device needs to be upgraded, a latest version of the firmware from a server; pushing the latest version of the firmware which has been downloaded to the ZigBee device; and issuing a firmware upgrade instruction to the ZigBee device after the latest version of the firmware is pushed to the ZigBee device successfully, to trigger the firmware of the ZigBee device to be upgraded based on the latest version of the firmware.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for upgrading a ZigBee device, wherein the method is performed by a gateway device including a WiFi module and a ZigBee module, the method comprises:
   acquiring a current version of firmware of the ZigBee device;
   querying a server for a latest version of the firmware of the ZigBee device;
   judging whether the current version of the firmware of the ZigBee device is the same as the latest version of the firmware;
   determining that the firmware of the ZigBee device needs to be upgraded, if the current version of the firmware of the ZigBee device is different from the latest version of the firmware;
   downloading, when the firmware of the ZigBee device needs to be upgraded, the latest version of the firmware from the server to the gateway device via the WiFi module;
   pushing the latest version of the firmware to the ZigBee device via the ZigBee module; and
   issuing a firmware upgrade instruction to the ZigBee device after the latest version of the firmware is pushed to the ZigBee device successfully and only after the lasted version is stored in a backup storage of a microcontroller unit (MCU) of the ZigBee device, to trigger the firmware of the ZigBee device to be upgraded based on the latest version of the firmware,
   wherein the querying the server for the latest version of firmware of the ZigBee device comprises:
      sending, to the server, a query command for querying the latest version of the firmware based on a set sending time; and
      acquiring a query result returned from the server, the query result corresponding to the query command and including the latest version of the firmware, and
   wherein the query result further includes a download address corresponding to the latest version of the firmware, and the downloading of the latest version of the firmware from the server comprises:
downloading the latest version of the firmware from the server based on the download address.

2. The method of claim 1, wherein the set sending time is selected from a preset period of time randomly.

3. A gateway device for upgrading a ZigBee device, comprising:
a WiFi module;
a ZigBee module;
a processor; and
a memory for storing instructions executable by the processor;
wherein the processor is configured to:
acquire a current version of firmware of the ZigBee device;
query a server for the latest version of the firmware of the ZigBee device;
judge whether the current version of the firmware of the ZigBee device is the same as the latest version of the firmware;
determine that the firmware of the ZigBee device needs to be upgraded, if the current version of the firmware of the ZigBee device is different from the latest version of the firmware;
download, when the firmware of the ZigBee device needs to be upgraded, the latest version of the firmware from the server to the gateway device via the WiFi module;
push the latest version of the firmware to the ZigBee device via the ZigBee module; and
issue a firmware upgrade instruction to the ZigBee device after the latest version of the firmware is pushed to the ZigBee device successfully and only after the lasted version is stored in a backup storage of a microcontroller unit (MCU) of the ZigBee device, to trigger the firmware of the ZigBee device to be upgraded based on the latest version of the firmware,
wherein the processor is further configured to:
send, to the server, a query command for querying the latest version of the firmware based on a set sending time; and
acquire a query result returned from the server, the query result corresponding to the query command and including the latest version of the firmware,
wherein the query result further includes a download address corresponding to the latest version of the firmware, and the processor is further configured to:
download the latest version of the firmware from the server based on the download address.

4. The gateway device of claim 3, wherein the set sending time is selected from a preset period of time randomly.

5. A non-transitory computer-readable storage medium having stored thereon instructions that, when executed by a processor of a gateway device that includes a WiFi module and a ZigBee module, cause the gateway device to perform a method for upgrading a ZigBee device, the method comprising:
acquiring a current version of firmware of the ZigBee device;
querying a server for a latest version of the firmware of the ZigBee device;
judging whether the current version of the firmware of the ZigBee device is the same as the latest version of the firmware;
determining that the firmware of the ZigBee device needs to be upgraded, if the current version of the firmware of the ZigBee device is different from the latest version of the firmware;
downloading, when the firmware of the ZigBee device needs to be upgraded, the latest version of the firmware from the server to the gateway device via the WiFi module;
pushing the latest version of the firmware to the ZigBee device via the ZigBee module; and
issuing a firmware upgrade instruction to the ZigBee device after the latest version of the firmware is pushed to the ZigBee device successfully and only after the lasted version is stored in a backup storage of a microcontroller unit of the ZigBee device, to trigger the firmware of the ZigBee device to be upgraded based on the latest version of the firmware,
wherein the querying the server for the latest version of firmware of the ZigBee device comprises:
sending, to the server, a query command for querying the latest version of the firmware based on a set sending time; and
acquiring a query result returned from the server, the query result corresponding to the query command and including the latest version of the firmware, and
wherein the query result further includes a download address corresponding to the latest version of the firmware, and the downloading of the latest version of the firmware from the server comprises:
downloading the latest version of the firmware from the server based on the download address.

* * * * *